US008676226B2

(12) United States Patent
Wu

(10) Patent No.: US 8,676,226 B2
(45) Date of Patent: Mar. 18, 2014

(54) METHOD OF HANDLING LOCATION SERVICE AND RELATED COMMUNICATION DEVICE

(75) Inventor: Chih-Hsiang Wu, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 243 days.

(21) Appl. No.: 12/832,081

(22) Filed: Jul. 8, 2010

(65) Prior Publication Data

US 2011/0009130 A1   Jan. 13, 2011

Related U.S. Application Data

(60) Provisional application No. 61/224,062, filed on Jul. 9, 2009.

(51) Int. Cl.
*H04W 24/00* (2009.01)

(52) U.S. Cl.
USPC .......... 455/456.1; 455/552.1; 455/456.6; 370/352

(58) Field of Classification Search
USPC .......... 455/456.1, 552.1, 456.6; 370/352
See application file for complete search history.

(56) References Cited

U.S. PATENT DOCUMENTS

| 7,310,523 | B1* | 12/2007 | Cook et al. ............. 455/426.1 |
| 8,131,290 | B2* | 3/2012 | Lamba et al. ............. 455/433 |
| 2003/0014189 | A1 | 1/2003 | Dooley |
| 2004/0185870 | A1 | 9/2004 | Matsuda |
| 2005/0037775 | A1* | 2/2005 | Moeglein et al. ......... 455/456.1 |
| 2007/0082682 | A1 | 4/2007 | Kim |
| 2008/0139219 | A1* | 6/2008 | Boeiro et al. ............. 455/456.2 |
| 2008/0227468 | A1* | 9/2008 | Niska et al. ............. 455/456.2 |
| 2008/0293431 | A1* | 11/2008 | Buerger et al. .......... 455/456.1 |
| 2009/0046655 | A1* | 2/2009 | Zhao et al. ............. 370/331 |
| 2009/0117915 | A1* | 5/2009 | Lee et al. ............. 455/456.1 |
| 2010/0075658 | A1* | 3/2010 | Hou et al. ............. 455/422.1 |
| 2010/0153001 | A1* | 6/2010 | Bauchot et al. .......... 701/201 |

FOREIGN PATENT DOCUMENTS

| CN | 1518391 A | 8/2004 |
| CN | 1529993 A | 9/2004 |
| CN | 101330725 A | 12/2008 |

(Continued)

OTHER PUBLICATIONS

3rd Generation Partnership Project; Technical Specification Group Radio Access Network; Evolved Universal Terrestrial Radio Access (E-UTRA); Stage 2 functional specification of User Equipment (UE) positioning in E-UTRAN (Release 9), 3GPP TS 36.305 V1.1.1 (Jul. 2009), XP050389757, Sophia Antipolis Valbonne—France.

(Continued)

*Primary Examiner* — Danh Le
(74) *Attorney, Agent, or Firm* — Winston Hsu; Scott Margo

(57) ABSTRACT

A method of handling location service for a mobile device compatible with a plurality of radio access technologies (RATs) in a wireless communication system is disclosed. The method comprises utilizing a first RAT of the plurality of RATs to communicate with a network of the wireless communication system, receiving a first message including positioning support information of the network from the network, and determining whether to initiate a location service in the first RAT or in a second RAT of the plurality of RATs according to the positioning support information.

12 Claims, 8 Drawing Sheets

(56) References Cited

FOREIGN PATENT DOCUMENTS

| | | | |
|---|---|---|---|
| EP | 1 443 791 A1 | 8/2004 |
| JP | 2009529835 A | 8/2009 |
| KR | 1020060070493 A | 6/2006 |
| WO | 9946947 A1 | 9/1999 |
| WO | 03007631 A2 | 1/2003 |
| WO | 03007631 A3 | 1/2003 |
| WO | 2007103975 A2 | 9/2007 |
| WO | 2007103975 A3 | 9/2007 |
| WO | 2007137615 A1 | 12/2007 |

OTHER PUBLICATIONS

3rd Generation Partnership Project; Technical Specification Group Services and System Aspects; Circuit Switched Fallback in Evolved packet System; Stage 2 (Release 9), pp. 1-50, 3GPP TS 23.272 V9.0.0 (Jun. 2009), XP007915563, Sophia Antipolis Valbonne—France.

European search report mailed on Dec. 22, 2010 for the EP application No. 10169003.0, filed Jul. 9, 2010, p. 1-7.

Office action mailed on May 2, 2013 for the China application No. 201010231597.2, filing date: Jul. 9, 2010, p. 1-9.

Qualcomm Europe, "Initial proposed contents for stage 3 LPP specification", 3GPP TSG-RAN WG2 #66 bis (R2-093862), Jun. 29-Jul. 3, 2009.

Fujitsu, "Update of MS classmark 2 and MS Network Capability to support LCS", 3GPP TSG-CN1 Meeting #15 (Tdoc N1-010185), Jan. 15-19, 2001, p. 1,3,5.

3GPP TS 44.031 version 7.5.0 Release 7 (Jun. 2007), p. 7-10.

Office action mailed on May 21, 2012 for the Taiwan application No. 099122708, filing date: Jul. 9, 2010, p. 1-13.

Office action mailed on Mar. 7, 2012 for the Korea application 10-2010-0066628, filing date Jul. 9, 2010, p. 1-3.

Office action mailed on May 15, 2012 for the Japanese application No. 2010-157113, filing date Jul. 9, 2010, p. 1-3.

Office action mailed on Jul. 31, 2012 for the China application No. 201010231597.2, filing date Jul. 9, 2010, p. 1-10.

3GPP TS 23.272 V8.3.0 3rd Generation Partnership Project; Technical Specification Group Services and System Aspects; Circuit Switched Fallback in Evolved Packet System; Stage 2 (Release 8), Mar. 2009.

3GPP R2-094071 Miscellaneous corrections to TS 36.305, Jun. 29, 2009.

Notice of allowance mailed on Apr. 23, 2013 for the Japanese application No. 2010-157113, filing date Jul. 9, 2010, pp. 1-3.

* cited by examiner

METHOD OF HANDLING LOCATION SERVICE AND RELATED COMMUNICATION DEVICE

CROSS REFERENCE TO RELATED APPLICATIONS

This application claims the benefit of U.S. Provisional Application No. 61/224,062, field on Jul. 9, 2009 and entitled "Methods for initiating location services in wireless communications system" the contents of which are incorporated herein in their entirety.

BACKGROUND OF THE INVENTION

1. Field of the Invention

A method utilized in a wireless communication and related communication device are disclosed, and more particularly, to a method of handling location services in a wireless communication system and related communication device.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as user equipments (UEs).

Location service (LCS) is used for UE positioning and includes a mobile originate location request (MO-LR), a mobile terminated location request (MT-LR), and a network induced location request (NI-LR). The LCS is a service concept in system (e.g. Global System for Mobile Communications (GSM) or Universal Mobile Telecommunications System (UMTS)) standardization, and requires positioning functionality for implement. The LCS utilizes one or more positioning methods, such as cell identity (ID) based method, observed time difference of arrival (OTDOA) method, assisted Global Navigation Satellite System (A-GNSS) method, etc, in order to determine the location of the UE.

In the LTE system, the UE initiates a location service (e.g. the MO-LR) with an evolved serving mobile location centre (E-SMLC) in the LTE system when the LTE system supports the positioning functionality. The E-SMLC manages the support of different location services for the UE, including positioning of UE and delivery of assistance data to UE. On the other hand, the UE triggers a circuit switched (CS) fallback procedure to other system (e.g. the GSM or the UMTS) supporting the positioning functionality when the LTE system does not support the positioning functionality. Then, the UE initiates the MO-LR in the UMTS/GSM. That is, the CS fallback allows the UEs to switch (e.g. handover, cell change order or redirection) from the E-UTRAN to other network (e.g. Universal Terrestrial Radio Access Network (UTRAN) of the UMTS) to initiate the location service in the UMTS. The CS fallback procedure shall be well-known in the art, so it is not given herein.

Similarly, the LTE network may initiate the MT-LR/NI-LR to the UE if the LTE network supports the positioning functionality, otherwise the network initiates the MT-LR/NI-LR to the UE in the UMTS network by the CS fallback procedure.

Due to unclear specification for the location services in the LTE system, several scenarios are described as follows.

In the first scenario, for a UE with UMTS/LTE positioning and CS fallback capabilities, the UE camping on a LTE cell can either initiate the MO-LR in LTE or in UMTS by CS fallback procedure. However the network cannot control the UE to initiate the MO-LR in LTE or in UMTS, thereby causing mobility management or load problem.

In the second scenario, for a UE with UMTS/LTE positioning and CS fallback capabilities, the UE camping on a LTE cell can either initiate a MO-LR in LTE network or in UMTS network by CS fallback procedure. However, the LTE system does not provide mechanism for the UE to select LTE or UMTS network to initiate the MO-LR. The UE fails to initiate the MO-LR if the UE selects the LTE network but the LTE network does not support positioning functions. After that, the UE indicates to the user that the initiation of MO-LR location service fails. In this situation, the UE does not initiate the MO-LR in the UMTS network even the UMTS network supports positioning functions.

In the third scenario, the network does not know if the UE supports LTE positioning protocol (LPP). Therefore the network cannot determine to initiate the MT-LR/NI-LR in LTE network or UMTS network by the CS fallback procedure. Please note that, the LPP is terminated between the UE and the E-SMLC, and is a point-to-point positioning protocol between the E-SMLC the UE in order to position the UE. The LPP supports positioning and location related services for the UE accessing E-UTRAN, and is intended to enable positioning for LTE using a multiplicity of different position methods.

In the fourth scenario, the network may initiate the MT-LR/NI-LR to the UE camping on LTE network in UMTS network by CS fallback, and the UE rejects the MT-LR/NI-LR due to not supporting LCS or positioning functionality. The drawback is that the UE is unnecessarily handover to GSM or UTRAN network. This unnecessary handover to GSM/UTRAN from LTE wastes resources (i.e. power, bandwidth) because of signaling messages exchange between the UE and network and between LTE and GSM/UTRAN networks. Furthermore, the UE possibly reselects back to LTE network after the UE enters idle mode. This is an unnecessary reselection and wastes UE power and possibly misses paging during the reselection.

SUMMARY OF THE INVENTION

A method of handling location service in a wireless communication system is disclosed to solve the abovementioned problems.

A method of handling location service for a mobile device compatible with a plurality of radio access technologies (RATs) in a wireless communication system is disclosed. The method comprises utilizing a first RAT of the plurality of RATs to communicate with a network of the wireless communication system, receiving a first message including positioning support information of the network from the network, and determining whether to initiate a location service in the first RAT or in a second RAT of the plurality of RATs according to the positioning support information.

A method of handling location service for a mobile device compatible with a plurality of radio access technologies (RATs) in a wireless communication system is disclosed. The method comprises initiating a first location service in a first RAT of the plurality of RATs, and initiating a second location service in a second RAT of the plurality of RATs when the initiation of the first location service is failed in the first RAT.

A method of handling location service for a network in a wireless communication system comprising a mobile device compatible with a plurality of radio access technologies (RATs) is disclosed. The method comprises initiating a first location service of the mobile device in a first RAT of the plurality of RATs, and initiating a second location service of the mobile device in a second RAT of the plurality of RATs when the initiation of the first location service is failed in the first RAT.

A method of handling location service for a network in a wireless communication system is disclosed. The method comprises receiving from a mobile device a first message including positioning capability information of the mobile device, in a first radio access technology (RAT), and determining whether to initiate a location service of the mobile device either in the first RAT or in a second RAT, according to the positioning capability information.

A mobile device compatible with a plurality of radio access technologies (RATs) of a wireless communication system for handling location service is disclosed. The mobile device comprises means for utilizing a first RAT of the plurality of RATs to communicate with a network of the wireless communication system, means for receiving a first message including positioning support information of the network, from the network, and means for determining whether to initiate a location service in the first RAT or in a second RAT of the plurality of RATs, according to the positioning support information.

A mobile device compatible with a plurality of radio access technologies (RATs) of a wireless communication system for handling location service is disclosed. The mobile device comprises means for initiating a first location service in a first RAT of the plurality of RATs, and means for initiating a second location service in a second RAT of the plurality of RATs when the initiation of the first location service is failed in the first RAT.

A network of a wireless communication system for handling location service, the wireless communication system comprising a mobile device compatible with a plurality of radio access technologies (RATs) is disclosed. The network comprises means for initiating a first location service of the mobile device in a first RAT of the plurality of RATs, and means for initiating a second location service of the mobile device in a second RAT of the plurality of RATs when the initiation of the first location service is failed in the first RAT.

A network of a wireless communication system for handling location service is disclosed. The network comprises means for receiving from a mobile device a first message including positioning capability information of the mobile device, in a first radio access technology (RAT), and means for determining whether to initiate a location service of the mobile device either in the first RAT or in a second RAT, according to the positioning capability information.

A network of a wireless communication system for handling location service is disclosed. The network comprises means for requesting a mobile device for positioning capability information of the mobile device in a first radio access technology (RAT), means for receiving the positioning capability information from the mobile device, means for initiating a location service of the mobile device in a second RAT when the positioning capability information indicates that the mobile device supports the location service, and means for not initiating the location service when the positioning capability information indicates that the mobile device does not support the location service.

These and other objectives of the present disclosure will no doubt become obvious to those of ordinary skill in the art after reading the following detailed description of the preferred example that is illustrated in the various figures and drawings.

DETAILED DESCRIPTION

Figure 1:
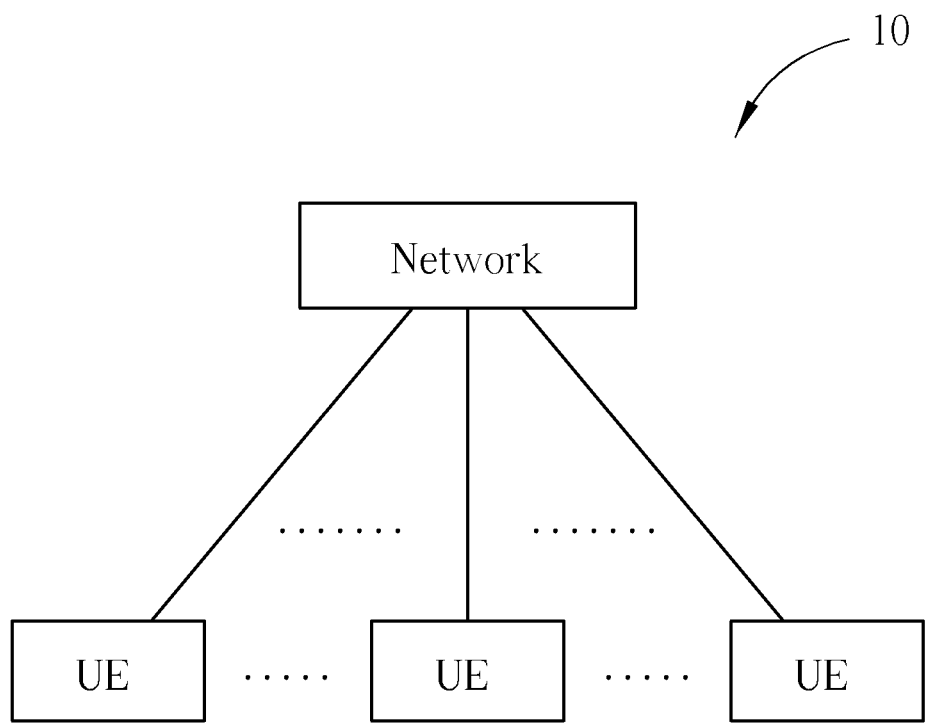
FIG. 1 illustrates a schematic diagram of an exemplary wireless communication system.

Please refer to FIG. 1, which illustrates a schematic diagram of a wireless communication system 10 according to an example. Briefly, the wireless communication system 10 is composed of a network and a plurality of mobile devices. The wireless communication system 10 can be a UMTS (Universal Mobile Telecommunications System), an LTE (long-term evolution) system or any other similar network system. In the LTE system, the network can be referred as a EUTRAN (evolved-UTRAN) comprising a plurality of eNBs or a core network entity (e.g. Mobility Management Entity called MME), whereas the mobile devices are referred as to user equipments (UEs). The UEs can be devices such as mobile phones, computer systems, etc. This terminology will be used throughout the application for ease of reference. However, this should not be construed as limiting the disclosure to any one particular type of network. In some examples, the network and the UE may be seen as a transmitter or receiver according to transmission direction, e.g., for uplink (UL), the UE is the transmitter and the network is the receiver, and for downlink (DL), the network is the transmitter and the UE is the receiver.

Figure 2:
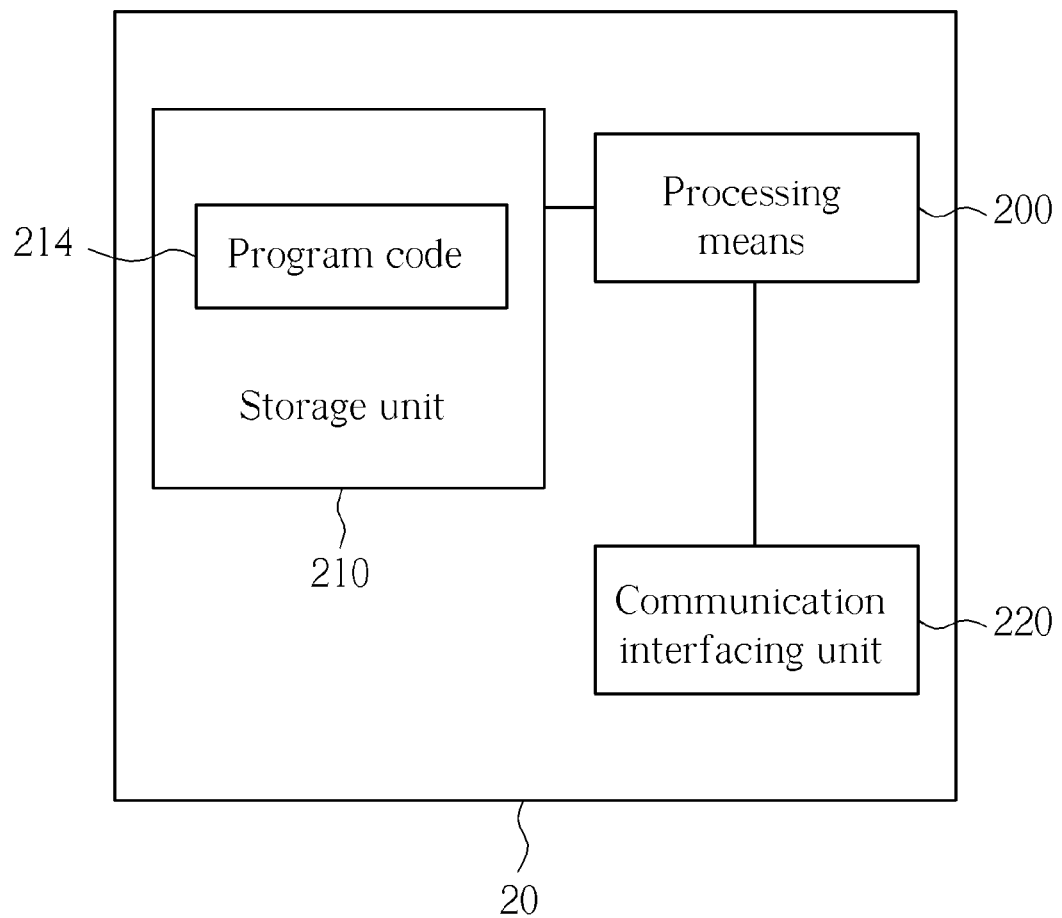
FIG. 2 illustrates a schematic diagram of an exemplary communication device.

FIG. 2 illustrates a schematic diagram of an exemplary communication device 20. The communication device 20 can be the mobile device shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that can store program code 214, for access by the processing means 200. Examples of the storage unit 210 include but are not limited to a subscriber identity module (SIM), read-only memory (ROM), flash memory, random-access memory (RAM), CD-ROMs, magnetic tape, hard disk, and optical data storage device. The communication interfacing unit 220 is preferably a radio transceiver and can exchange wireless signals with the network according to processing results of the processing means 200.

Figure 3:
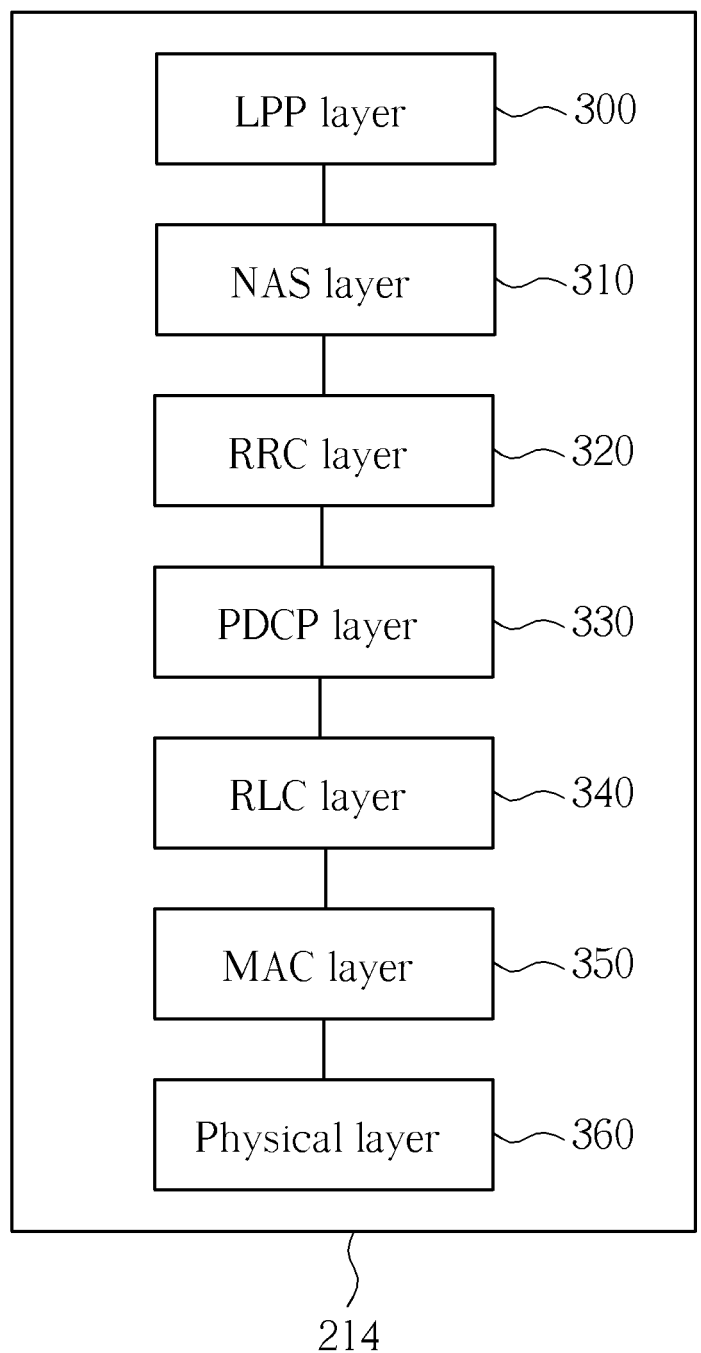
FIG. 3 illustrates a schematic diagram of exemplary program code.

Please refer to FIG. 3, which illustrates a schematic diagram of the program code 214 for the LTE system according to an example. The program code 214 includes program code of multiple communications protocol layers, which from top to bottom are a LTE positioning protocol (LPP) layer 300, a Non Access Stratum (NAS) layer 310, a radio resource control (RRC) layer 320, a packet data convergence protocol (PDCP) layer 330, a radio link control (RLC) layer 340, a medium access control (MAC) layer 350 and a physical (PHY) layer 360. The LPP layer 300 supports positioning and related location services (e.g. a mobile originate location request (MO-LR), a mobile terminated location request (MT-LR), and a network induced location request (NI-LR)) for the UE accessing the E-UTRAN, and is intended to enable positioning for LTE using a multiplicity of different position methods.

Figure 4:
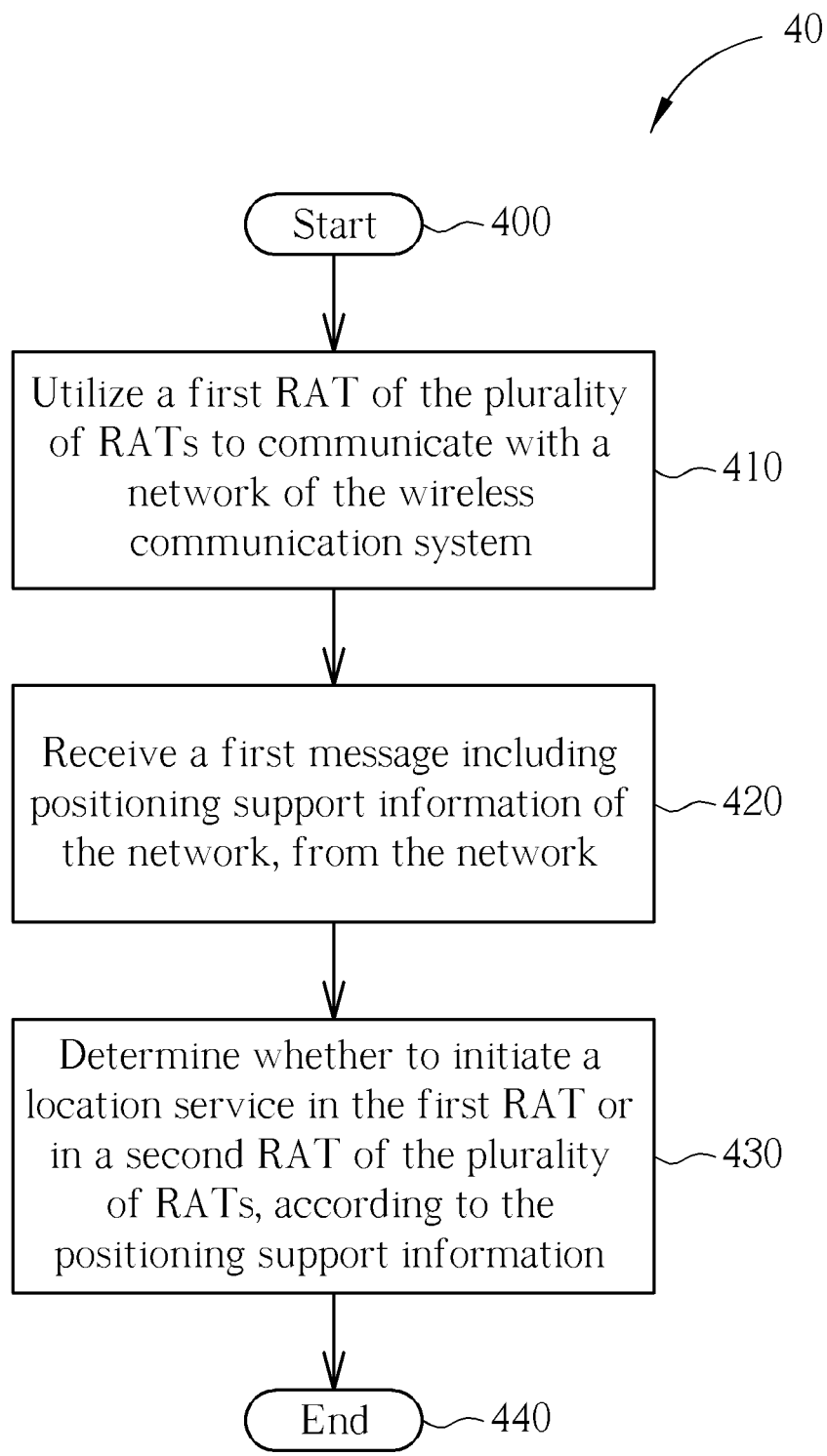
FIG. 4-8 are flowcharts of exemplary processes according to the present disclosure.

Please refer to FIG. 4, which illustrates a flowchart of an exemplary process 40. The process 40 is utilized in a UE for handling location service, where the UE can be the mobile device of FIG. 1 and is compatible with a plurality of radio access technologies (RATs). The process 40 may be compiled into the program code 214 and includes the following steps:

Step 400: Start.

Step 410: Utilize a first RAT of the plurality of RATs to communicate with a network of the wireless communication system.

Step 420: Receive a first message including positioning support information of the network, from the network.

Step 430: Determine whether to initiate a location service in the first RAT or in a second RAT of the plurality of RATs, according to the positioning support information.

Step 440: End.

According to the process 40, the UE receives the positioning support information from the network supporting the first RAT, and determines whether to initiate the location service in the first RAT or in the second RAT according to the positioning support information. For example, the UE initiates the location service in the first RAT when the positioning support information indicates that positioning functionality is supported. In addition, the UE initiates the location service in the second RAT when the positioning support information indicates that positioning functionality is not supported. Therefore, the network is able to control the initiation of the location service of the UE.

Moreover, the positioning support information includes at least one of information of an LPP support information, an evolved serving mobile location centre (E-SMLC) capability, a supported positioning method (e.g. cell identity (ID) based method, observed time difference of arrival (OTDOA) method, and assisted Global Navigation Satellite System (A-GNSS)), and a supported location service (e.g. the MO-LR, MT-LR, and NI-LR).

In addition, the network transmits the positioning support information to the UE by the first message. The first message may be a radio resource control (RRC) message or a non-access stratum (NAS) message. The RRC message may be a broadcast control channel (BCCH) message (i.e. system information) or a dedicated message (e.g. RRCConnection-Setup message). The NAS message may be an ATTAH ACCEPT message, location area update (LAU) ACCEPT message, routing area update (RAU) ACCEPT message or a tracking area update (TAU) ACCEPT message. Those messages are examples and not intend to limit the scope.

Take an example based on the concept of the process 40. Assume the first RAT is a LTE RAT, and second RAT is a UMTS RAT. When the UE wants to initiate the MO-LR location service, the UE firstly transmits a second message to request the LTE network (e.g. E-UTRAN) for the positioning support information. The second message may be a LPP Capability request message. After the LTE network receives the LPP Capability request message, the LTE network responds the LPP Capability request message with the LPP Capability indication message including the positioning support information to the UE. If the positioning support information indicates that positioning functionality is supported, the UE sends a SERVICE REQUEST message to the LTE network for initiation of the MO-LR location service. On the other hand, if the positioning support information indicates that positioning functionality is not supported, the UE sends an EXTENED SERVICE REQUEST message to the LTE network for initiation of the CS fallback to UMTS. After this, the UE is handover to the UMTS RAT from the LTE RAT, and then initiates the MO-LR location service in the UMTS RAT.

Figure 5:
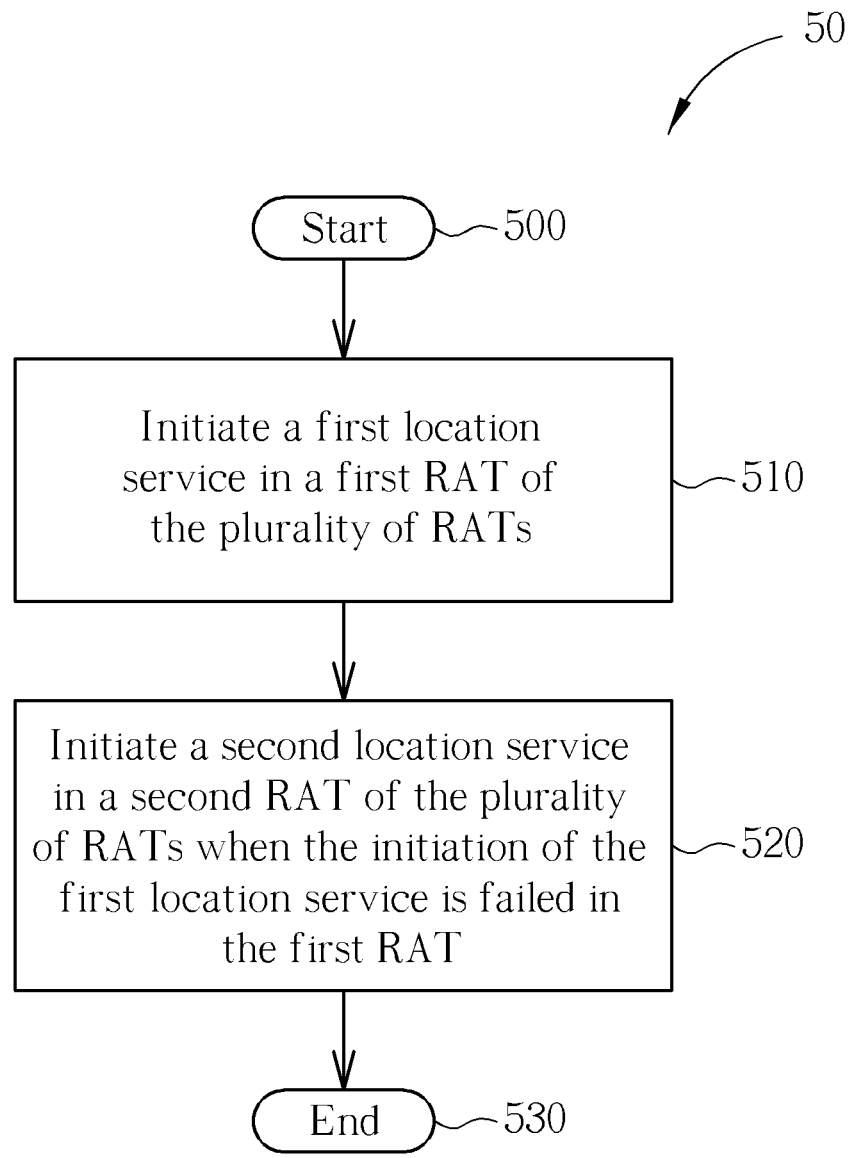

Please refer to FIG. 5, which illustrates a flowchart of an exemplary process 50. The process 50 is utilized in a UE for handling location service, where the UE can be the mobile device of FIG. 1 and is compatible with a plurality of RATs. The process 50 may be compiled into the program code 214 and includes the following steps:

Step 500: Start.

Step 510: Initiate a first location service in a first RAT of the plurality of RATs.

Step 520: Initiate a second location service in a second RAT of the plurality of RATs when the initiation of the first location service is failed in the first RAT.

Step 530: End.

According to the process 50, the UE initiates the first location service in the first RAT, and initiates the second location service in the second RAT when the first location service is failed in the first RAT. Therefore, the UE can initiate the second location service without indication from a user of the UE (e.g. the user does not need to input any signal to indication the initiation of the second location service) when the first location service is failed, thereby increasing location service efficiency.

For example, the UE determines to initiate the MO-LR location service in the LTE RAT. The UE initiates a new MO-LR location service in the UMTS RAT by the CS fallback procedure without user intervention if the UE fails to initiate the MO-LR location service in the LTE RAT. Or, the UE determines to initiate the MO-LR location service in the UMTS RAT by the CS fallback procedure. The UE initiates a new MO-LR location service in the LTE RAT without user intervention if the UE fails to initiate the MO-LR location service in the UMTS by the CS fallback procedure.

Figure 6:
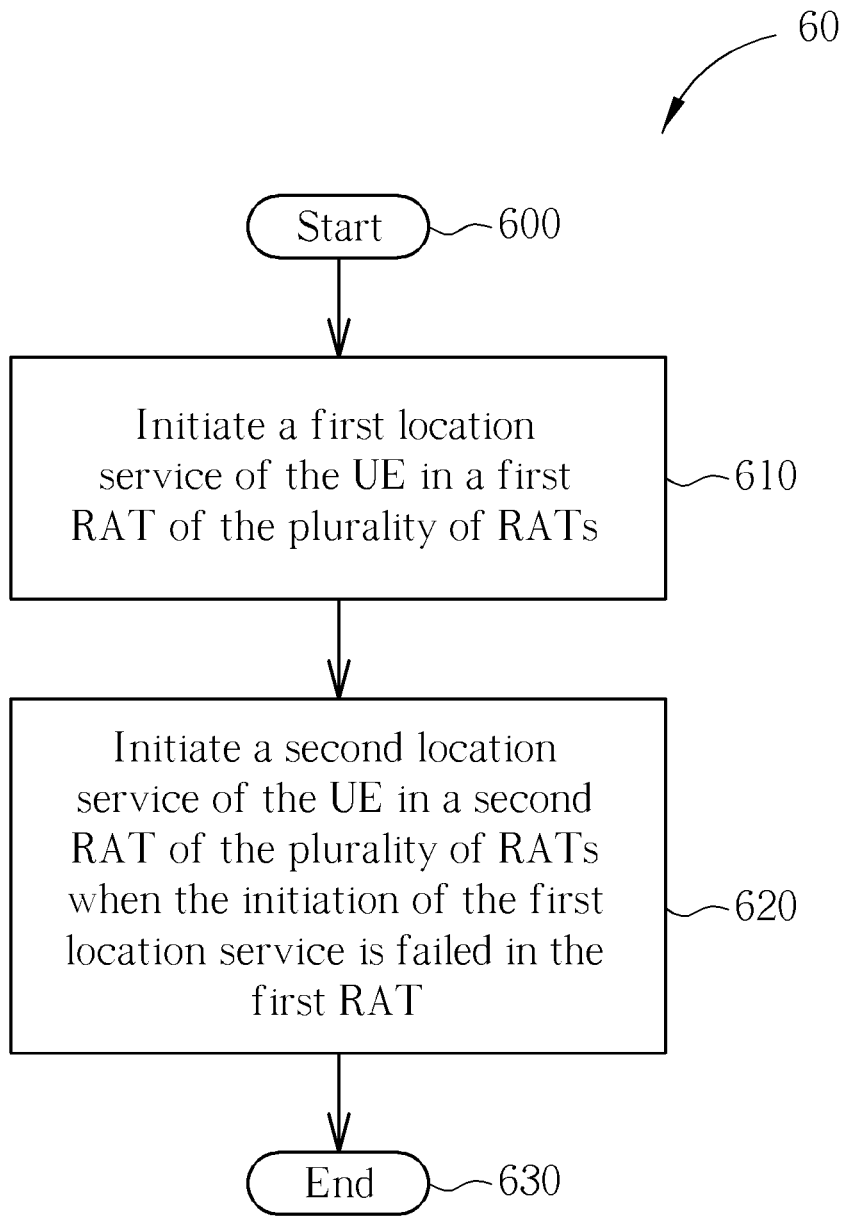

Please refer to FIG. 6, which illustrates a flowchart of an exemplary process 60. The process 60 is utilized in a network for handling location service. The process 60 may be compiled into the program code 214 and includes the following steps:

Step 600: Start.

Step 610: Initiate a first location service of the UE in a first RAT of the plurality of RATs.

Step 620: Initiate a second location service of the UE in a second RAT of the plurality of RATs when the initiation of the first location service is failed in the first RAT.

Step 630: End.

According to the process 60, the network initiates the first location service to the UE in the first RAT, and initiates the second location service to the UE in the second RAT when the first location service is failed in the first RAT. Therefore, the network can initiate the second location service to the UE when the first location service is failed, thereby increasing location service efficiency.

For example, the network determines to initiate the MT-LR location service to the UE in the LTE RAT. The network initiates a new MT-LR location service to the UE in the UMTS RAT by the CS fallback procedure if the MT-LR location service is failed due to the UE not supporting positioning in the LTE RAT. Or, the network determines to initiate the MT-LR location service to the UE in the UMTS RAT by the CS fallback procedure. The network initiates a new MT-LR location service to the UE in the LTE RAT if the MT-LR location service is failed due to the UE not supporting positioning in the UMTS. Please note that, the concept of this example can be used for the NI-LR location service also.

Figure 7:
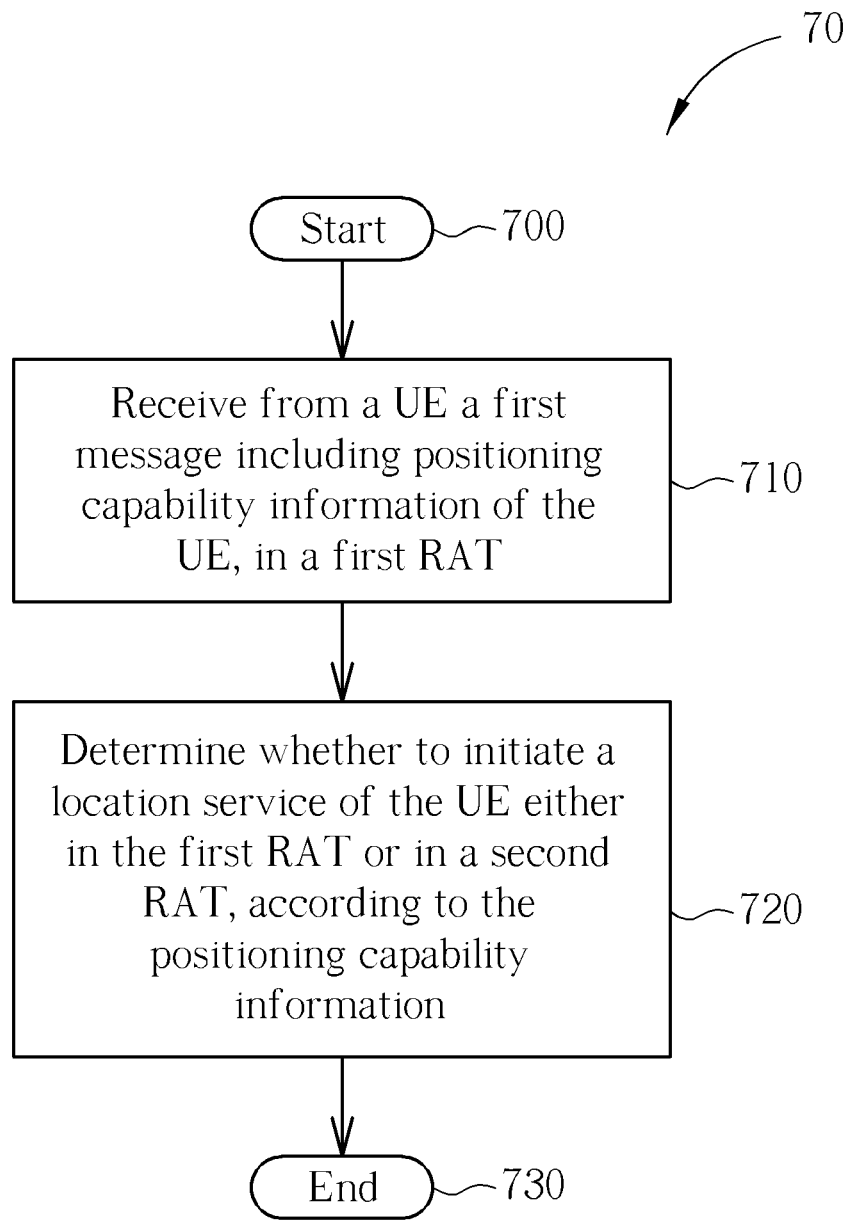

Please refer to FIG. 7, which illustrates a flowchart of an exemplary process 70. The process 70 is utilized in a network for handling location service. The process 70 may be compiled into the program code 214 and includes the following steps:

Step 700: Start.

Step 710: Receive from a UE a first message including positioning capability information of the UE, in a first RAT.

Step 720: Determine whether to initiate a location service of the UE either in the first RAT or in a second RAT, according to the positioning capability information.

Step 730: End.

According to the process 70, the UE may transmit the positioning capability information, without the indication/control from network, to the network via the first message. The positioning capability information may be LPP support information to notify that whether the UE implements LPP protocol. Therefore, after the network receives the positioning capability information, the network knows if the UE supports the LPP, and thereby determines whether to initiate the location service of the UE in the first RAT or in the second RAT. Thus, an opportunity of success of the location service is increased, thereby improving the location service efficiency.

In addition, the first message may be a RRC or NAS message. The RRC message is an RRCConnectionRequest message or an RRCConnectionSetupComplete message. The NAS message is an EMERGENCY ATTACH REQUEST message, an ATTACH REQUEST message, a ATTACH COMPLETE message, a TAU REQUEST message, a TAU COMPLETE message, or a SERVICE REQUEST message. Those messages are examples and not intend to limit the scope.

Figure 8:
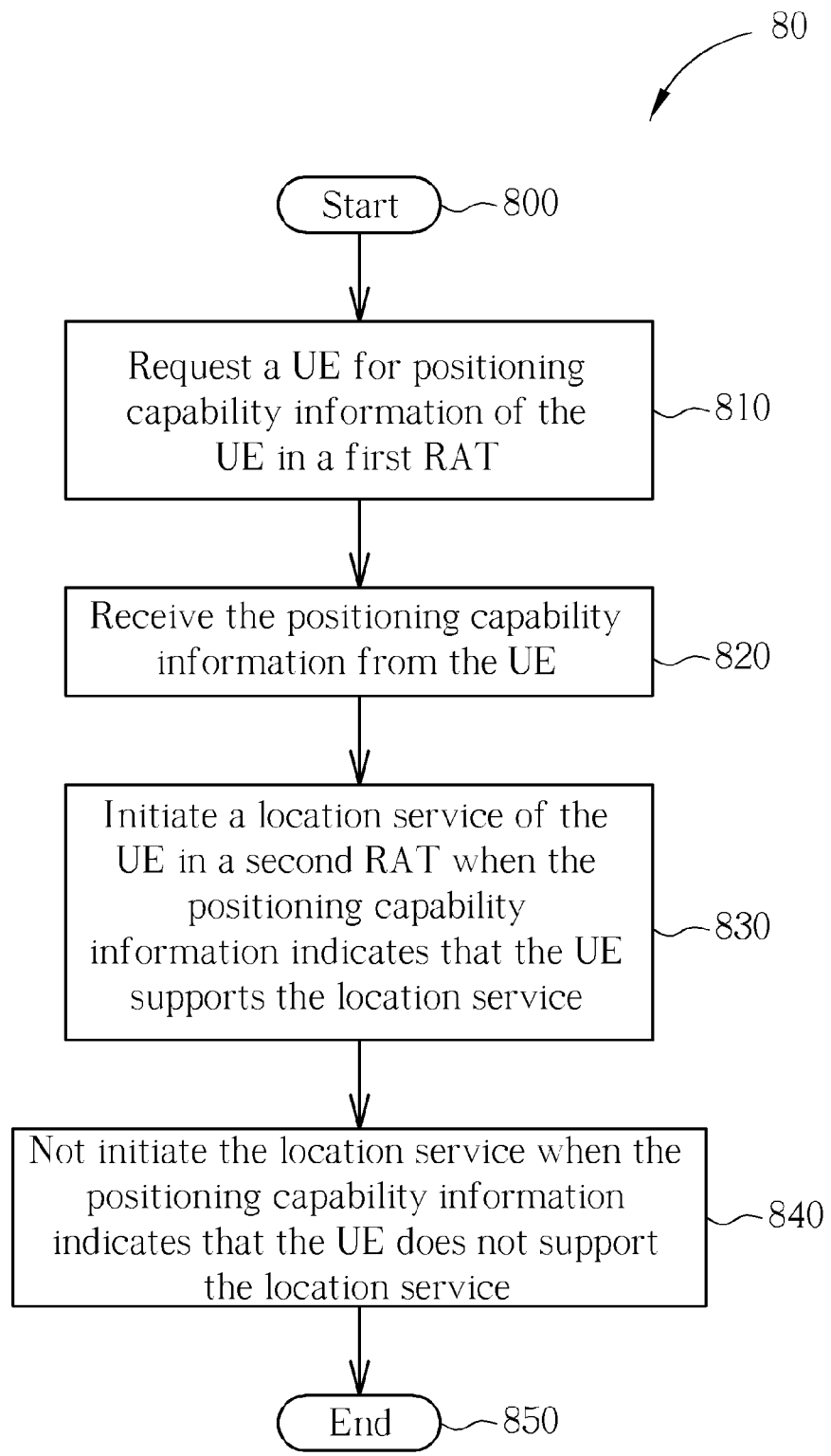

Take an example based on the concept of the process 70. Assume the first RAT is LTE RAT and the second RAT is UMTS RAT. When the network wants to initiate the MT-LR/NI-LR, the network firstly sends a second message to request the mobile device for the positioning capability information (e.g. supported positioning methods) before the first message is received. The second message may be a LPP Capability request message, so that the UE responds the LPP Capability request message with the LPP Capability indication message including the positioning capability information to the network. After the network receives the LPP Capability indication message including the positioning capability information, the network initiates the MT-LR/NI-LR to the UE in the LTE when the positioning capability information indicates that the UE supports the LPP, and initiates the MT-LR/NI-LR to the UE in the UMTS by the CS fallback procedure when the positioning capability information indicates that the UE doest not support the LPP Please refer to FIG. 8, which illustrates a flowchart of an exemplary process 80. The process 80 is utilized in a network for handling location service. The process 80 may be compiled into the program code 214 and includes the following steps:

Step 800: Start.

Step 810: Request a UE for positioning capability information of the UE in a first RAT.

Step 820: Receive the positioning capability information from the UE.

Step 830: Initiate a location service of the UE in a second RAT when the positioning capability information indicates that the UE supports the location service.

Step 840: Not initiate the location service when the positioning capability information indicates that the UE does not support the location service.

Step 850: End.

According to the process 80, the network requests the UE for the positioning capability information in the first RAT, and determines whether to initiate the location service in the second RAT according to the positioning capability information. For example, the network initiates the location service in the second RAT when the positioning capability information indicates that the UE supports the location service. In addition, the network stops to initiate the location service when the positioning capability information indicates that the UE doest not supports the location service.

Please note that, the network may request the UE for the positioning capability information before or after the UE is handover which is triggered by the CS fallback for the location service. For example, the UE knows whether the LTE RAT supports the location service or not according to a RRC connection established with the LTE network. Therefore, the UE initiates the CS fallback procedure for initiating the location service in the UMTS RAT when the LTE RAT does not support the location service. If the network requests the UE for the positioning capability information before the UE is handover to the UMTS, namely the network requests the UE for the positioning capability information in the LTE, the UE may not be handover to the UMTS when the positioning capability information indicates that the UE doest not supports the location service. Alternatively, the network may request the UE for the positioning capability after the UE is handover to the UMTS, namely the network request the UE for the positioning capability information in the UMTS. Thus, the UE does not perform the location service in the UMTS when the positioning capability information indicates that the UE does not support the location service.

Take an example based on the concept of the process 80. The network initiates a location service to the UE in the LTE RAT. The UE is triggered by the CS fallback procedure for initiating the location service in the UMTS RAT when the LTE RAT does not support the positioning functionality. Before the network handovers the UE to the UMTS, the network sends a UECapabilityEnquiry message to request the UE for the positioning capability information. Thus, the UE responds the UECapabilityEnquiry message with a UECapabilityInformation message including the positioning capability information to the network. After the network receives the UECapabilityInformation message, the network handovers the UE from the LTE RAT to the UMTS RAT if the positioning capability information indicates that the UE supports the location service, and then initiates the location service in the UMTS RAT. On the other hand, if the positioning capability information indicates that the UE does not support the location service, the network does not handover the UE to the UMTS RAT, and does not initiate the location service, so as to avoid unnecessarily handover.

Alternatively, the network may request the UE for the positioning capability information after the UE is handover to the UMTS. In this situation, the network sends a CLASSMARK ENQUIRY message to the UE for positioning capability information request, and the UE responds the CLASSMARK ENQUIRY message with a CLASSMARK CHANGE message including the positioning capability information to the network. After the network receives the CLASSMARK CHANGE message, the network initiates the location service in the UMTS RAT if the positioning capability information indicates that the UE supports the location service. In addition, the network stops to initiate the location service when the positioning capability information indicates that the UE doest not support the location service, so as to avoid resource waste.

One way for the UE to provide the positioning capability information to the network is described as below. The UE includes at least one of Mobile Station Classmark 2 information element (IE) and Mobile Station Classmark 3 IE in a message and sends the message to the network, when the UE supports the location service in the UMTS RAT. The purpose of the Mobile Station Classmark IE is to indicate general UE characteristics to the network. This affects the manner in which the network handles the operation of the UE. For example, the UE may indicate LCS support types in the Mobile Station Classmark 2 IE, and may indicate supported positioning methods in the Mobile Station Classmark 3 IE. Therefore, the network can determine whether to initiate the location service in the UMTS RAT according to the at least one of the mobile station classmark 2 IE and the mobile classmark 3 IE when the positioning capability information indicates that the UE supports the location service. In addition, the abovementioned message may be an ATTACH REQUEST message or a TAU REQUEST message for the UE camping on the LTE RAT. On the other hand, the message may be a LOCATION UPDATE REQUEST message or a ROUTING AREA UPDATE REQUEST message when the UE is handover to UMTS by CS fallback. Those messages are examples and not intend to limit the scope.

Please note that, the abovementioned steps of the processes including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20.

In conclusion, the exemplary method and means are provided to handle the location service. The network/UE can determine which RAT (e.g. the LTE or UMTS RAT) to initiate the location service according to the positioning capability information from the UE/network, thereby increasing the location service efficiency.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A method of handling location service for a mobile device compatible with a plurality of radio access technologies (RATs) in a wireless communication system, the method comprising:
utilizing a first RAT of the plurality of RATs to communicate with a network of the wireless communication system;
receiving a first message including positioning support information of the network, from the network, wherein the positioning support information indicates whether positioning is supported in the first RAT;
initiating a location service in the first RAT when the positioning support information indicates that positioning is supported in the first RAT; and
initiating the location service in a second RAT of the plurality of RATs when the positioning support information indicates that positioning is not supported in the first RAT.

2. The method of claim 1, wherein initiating the location service in the second RAT when the positioning support information indicates that positioning is not supported comprises:
initiating a circuit switched (CS) fallback procedure for entering the second RAT from the first RAT; and
initiating the location service in the second RAT.

3. The method of claim 1, wherein the first message is an RRC message or an NAS message.

4. The method of claim 3, wherein the RRC message is a broadcast control channel (BCCH) message or a dedicated message.

5. The method of claim 3, wherein the NAS message is an ATTAH ACCEPT message, a location area update (LAU) ACCEPT message, a routing area update (RAU) ACCEPT message or a tracking area update (TAU) ACCEPT message.

6. A mobile device compatible with a plurality of radio access technologies (RATs) of a wireless communication system for handling location service, the mobile device comprising:
means for utilizing a first RAT of the plurality of RATs to communicate with a network of the wireless communication system;
means for receiving a first message including positioning support information of the network, from the network, wherein the positioning support information indicates whether positioning is supported in the first RAT;
means for initiating a location service in the first RAT when the positioning support information indicates that positioning is supported in the first RAT; and
means for initiating the location service in a second RAT of the plurality of RATs when the positioning support information indicates that positioning is not supported in the first RAT.

7. The mobile device of claim 6, wherein the means for initiating the location service in the second RAT when the positioning support information indicates that positioning is not supported comprises:
means for initiating a circuit switched (CS) fallback procedure for entering the second RAT from the first RAT; and
means for initiating the location service in the second RAT.

8. The mobile device of claim 6, further comprising:
means for transmitting a second message to request the network for the positioning support information.

9. The mobile device of claim 6, wherein the positioning support information includes at least one of information of an evolved serving mobile location centre (E-SMLC) capability, a supported positioning method, a supported location service.

10. The mobile device of claim 6, wherein the first message is an RRC message or an NAS message.

11. The mobile device of claim 10, wherein the RRC message is a broadcast control channel (BCCH) message or a dedicated message.

12. The mobile device of claim 10, wherein the NAS message is an ATTAH ACCEPT message, a location area update (LAU) ACCEPT message, a routing area update (RAU) ACCEPT message or a tracking area update (TAU) ACCEPT message.

* * * * *